(12) United States Patent
Chen et al.

(10) Patent No.: US 12,251,867 B2
(45) Date of Patent: Mar. 18, 2025

(54) LINER STRUCTURE AND BLOW-MOLDING MANUFACTURING METHOD FORLINER STRUCTURE

(71) Applicant: CANATURE HEALTH TECHNOLOGY GROUP CO., LTD., Shanghai (CN)

(72) Inventors: Xiaogong Chen, Shanghai (CN); Lei Fan, Shanghai (CN); Tong Liu, Shanghai (CN); Mingche Zhou, Shanghai (CN)

(73) Assignee: CANATURE HEALTH TECHNOLOGY GROUP CO., LTD. (CN)

( * ) Notice: Subject to any disclaimer, the term of this patent is extended or adjusted under 35 U.S.C. 154(b) by 312 days.

(21) Appl. No.: 17/628,751

(22) PCT Filed: Sep. 26, 2021

(86) PCT No.: PCT/CN2021/120562
§ 371 (c)(1),
(2) Date: Jan. 20, 2022

(87) PCT Pub. No.: WO2022/170767
PCT Pub. Date: Aug. 18, 2022

(65) Prior Publication Data
US 2023/0158729 A1     May 25, 2023

(30) Foreign Application Priority Data

Feb. 10, 2021 (CN) .......................... 202110185005.6

(51) Int. Cl.
*B29C 49/20* (2006.01)
*B29K 23/00* (2006.01)
*F16J 12/00* (2006.01)

(52) U.S. Cl.
CPC ............... *B29C 49/20* (2013.01); *F16J 12/00* (2013.01); *B29C 2049/2008* (2013.01); *B29C 2049/2026* (2013.01); *B29K 2023/18* (2013.01)

(58) Field of Classification Search
CPC ............ B29C 49/20; B29C 2049/2008; B29C 2049/2026; B29C 2049/2404;
(Continued)

(56) References Cited

U.S. PATENT DOCUMENTS

2016/0123538 A1* 5/2016 Nakamura ............... F17C 13/06
220/582
2017/0284601 A1* 10/2017 Kusaba ..................... F17C 1/06
(Continued)

FOREIGN PATENT DOCUMENTS

CN         1182385         5/1998
CN         201173289       12/2008
(Continued)

OTHER PUBLICATIONS

Extended European Search Report mailed Sep. 15, 2023. European Patent Application No. 21854732.1.
(Continued)

*Primary Examiner* — Jacob T Minskey
*Assistant Examiner* — Caroline Beha
(74) *Attorney, Agent, or Firm* — McDonald Hopkins LLC

(57) ABSTRACT

A liner structure includes a liner main body and an insert located inside an opening of the liner main body. The liner main body is made of a polybutylene material. The liner structure has relatively good heat resistance within a temperature range corresponding to conventional liquid water, and can be used for containing hot water. Moreover, a feasible manufacturing method is provided. The method can
(Continued)

overcome defects of material characteristics through process optimization, so that can implement manufacturing the liner structure.

8 Claims, 4 Drawing Sheets

(58) Field of Classification Search
CPC .. B29C 2049/2414; B29C 49/24; F16J 12/00; B29K 2023/18
See application file for complete search history.

(56) References Cited

U.S. PATENT DOCUMENTS

| | | | |
|---|---|---|---|
| 2018/0238491 A1 | | 8/2018 | Imai |
| 2018/0238496 A1* | | 8/2018 | Otsubo ............... F17C 1/02 |
| 2020/0072416 A1* | | 3/2020 | Yoshida ............... F17C 1/06 |

FOREIGN PATENT DOCUMENTS

| | | |
|---|---|---|
| CN | 201173289 Y | 12/2008 |
| CN | 101544051 A | 9/2009 |
| CN | 101858432 | 10/2010 |
| CN | 201872328 U | 6/2011 |
| CN | 102452163 A | 5/2012 |
| CN | 103029287 A | 4/2013 |
| CN | 104108185 A | 10/2014 |
| CN | 104374087 | 2/2015 |
| CN | 106794618 | 5/2017 |
| CN | 106795895 | 5/2017 |
| CN | 110461730 | 11/2019 |
| CN | 210477778 U | 5/2020 |
| CN | 211891921 U | 11/2020 |
| CN | 112780769 | 5/2021 |
| CN | 112810112 | 5/2021 |
| CN | 215943660 U | 3/2022 |
| DE | 3017891 | 11/1981 |
| EP | 0503086 A1 | 9/1992 |
| GB | 1480281 | 7/1977 |
| WO | WO-2013008719 A1 * | 1/2013 ............... F16J 12/00 |

OTHER PUBLICATIONS

Patent Cooperation Treaty (PCT), International Search Report and Written Opinion for Application PCT/CN2021/120562 filed on Sep. 26, 2021, mailed Dec. 16, 2021, International Searching Authority, CN.
Liu et al., "Floating Photovoltaic Power Generation," 2020.
Tang et al., "Plastic products," Designer's Guide, 1993.
State Intellectual Property Office of People's Republic of China, Notification of First Office Action for Application No. 202110185005. 6, report issue date Jul. 24, 2024, China.

* cited by examiner

LINER STRUCTURE AND BLOW-MOLDING MANUFACTURING METHOD FOR LINER STRUCTURE

This application claims priority to Chinese Patent Application No. 202110185005.6 filed with the China National Intellectual Property Administration (CNIPA) on Feb. 10, 2021, the disclosure of which is incorporated herein by reference in its entirety.

TECHNICAL FIELD

The present application relates to a liner structure and a blow-molding manufacturing method for a liner structure.

BACKGROUND

With the improvement of living standards of people, the market of household water softeners is expanding gradually, and more and more household water softeners enter homes of people and are favored by people. A filter material tank used in such products is often a glass fiber reinforced plastic pressure vessel, and the glass fiber reinforced plastic pressure vessel used in conventional water softeners uses a polyethylene material (hereinafter referred to as PE material) as a substrate. The PE material has advantages of good hygiene, stable physico-chemical performance, long service life, and the like, but cannot be used on a high-temperature occasion. It is this point that limits the application of the softener product connected to the rear end of a water heater.

SUMMARY

The present application provides a liner structure and a blow-molding manufacturing method for a liner structure which can handle a case where a liner does not have heat resistance.

An embodiment provides a liner structure. The liner structure includes a liner main body and an insert located inside an opening of the liner main body. The liner main body is made of a polybutylene material.

In the present application, with the above-described structural form, the liner structure has relatively good heat resistance within the temperature range corresponding to conventional liquid water and can be used for containing hot water.

Optionally, the insert and the opening of the liner main body are nested with each other.

In the present application, through the above-described structural form, the liner main body and the insert are combined more tightly so that the liner structure has better integrality and better structural stability to prevent cracking or deformation caused by heat.

Optionally, the insert is provided with a via and an extension extending through the via is disposed at the opening of the liner main body.

In the present application, through the above-described structural form, the opening of the liner main body and the insert are connected more firmly, and the opening of the liner main body extends through the via with effects of positioning and stabilization.

Optionally, the diameter of the front end of the extension extending through the via is larger than the diameter of the via.

In the present application, through the above-described structural form, even if the insert moves in the direction of detaching from the opening of the liner main body, the insert can be stuck by the front end of the extension with a relatively large diameter and cannot detach easily.

An embodiment provides a blow-molding manufacturing method for a liner structure. The liner structure includes a liner main body and an insert located inside an opening of the liner main body. The blow-molding manufacturing method for a liner structure includes preheating the insert and conveying a polybutylene material blank from a neck ring mold, where the temperature range is 170° C. to 230° C. when the material blank is conveyed from the neck ring mold.

In the present application, the above-described method reduces both difficulty and the cost of manufacturing the liner structure and improves the manufacturing efficiency.

Optionally, before the material blank is conveyed from the neck ring mold, the insert preheated and a blowing needle are secured to a pull-down mechanism.

Optionally, the method further includes closing the mold and making the pull-down mechanism pull down the insert and the blowing needle.

In the present application, through the above-described method, the insert preheated and the blowing needle are pulled down after the mold is closed, so that the polybutylene material can form an extension through a via during a pull-down process, and thus the insert is combined more tightly with the liner main body and does not fall off easily.

Optionally, after the polybutylene material blank is conveyed from the neck ring mold and before the mold is closed, the method further includes placing the material blank on a material expanding mechanism, then expanding outward the material blank through the material expanding mechanism, and then sleeving the material blank on the insert.

In the present application, through the above-described method, the material blank with a relatively small diameter is expanded outward and then sleeved on the insert so that the material blank is combined tightly with the insert, and thus a nested structure is easier to form. In addition, a lighter and thinner liner main body can be obtained by using the material blank with a small diameter, which is advantageous for molding while reducing the cost and improving the material utilization rate.

Optionally, the material blank covers an entirety of the material expanding mechanism.

In the present application, through the above-described method, the entirety of the material expanding mechanism is covered with the material blank, so that the step of expanding outward is easier and an outward expanding effect is more uniform.

Optionally, the insert has a preheating time of not less than five minutes and a preheating temperature of not less than 70° C.

In the present application, through the above-described method, the insert in direct contact with the material blank is preheated to a preset temperature so that the insert does not have a rapid cooling effect on the polybutylene material in direct contact with the insert, thereby maintaining fluidity of the insert at a high temperature. In this manner, a liner material and the insert are nested more fully and bonded more firmly, and do not delaminate, and thus structural strength of the liner can be improved, and yield can be improved.

Optionally, a temperature range of the material blank is 190° C. to 210° C.

In the present application, through the above-described method, the polybutylene material blank can be blow-molded at a suitable molding temperature to avoid molding defects such as fracture due to falling material and cracking due to insufficient strength so as to obtain the best mechanical performance and heat resistance performance.

Figure 1:
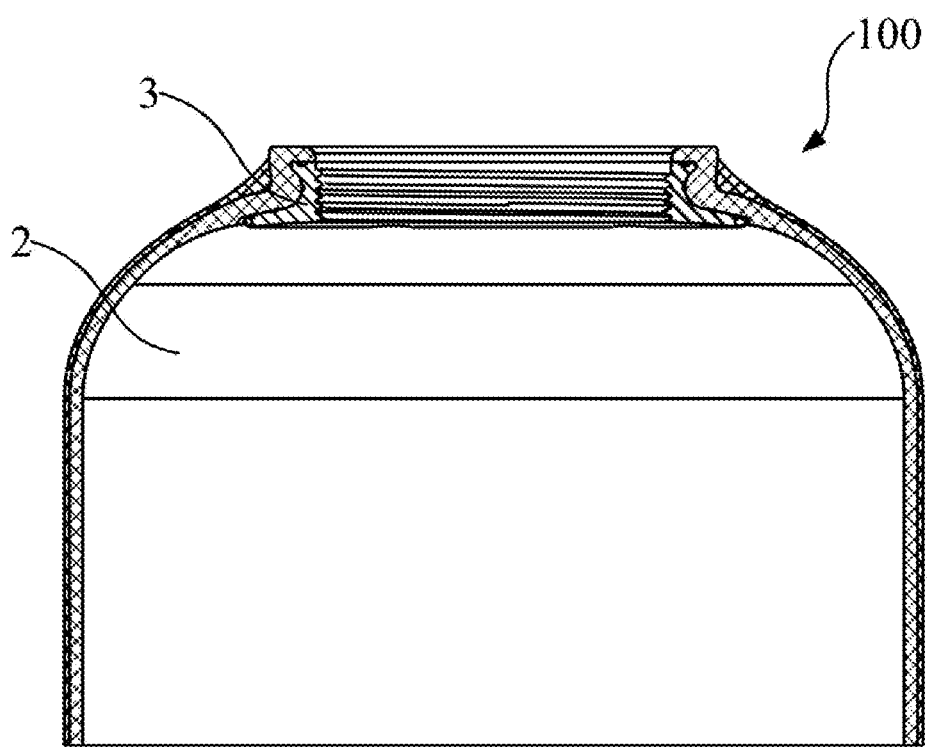
FIG. 1 is a sectional view of an opening of a liner structure according to an embodiment of the present application.
Figure 2:
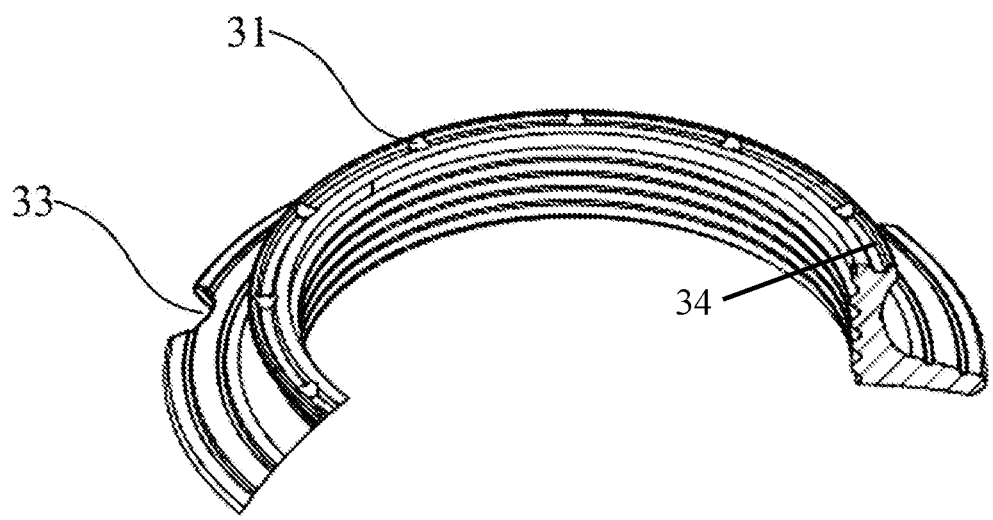
FIG. 2 is a sectional view of an insert according to an embodiment of the present application.
Figure 3:
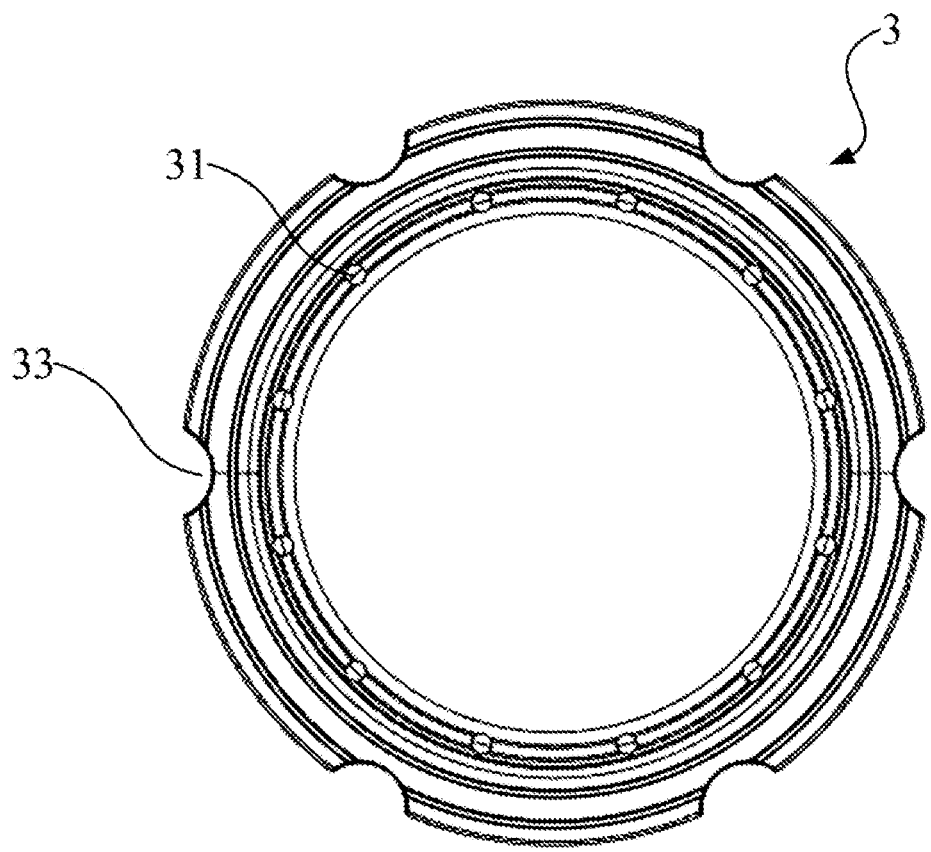
FIG. 3 is a top view of an insert according to an embodiment of the present application.

REFERENCE LIST 100 liner structure
2 liner main body
21 extension
3 insert
31 via
32 reinforcing rib
33 notch
34 connection

DETAILED DESCRIPTION

As shown in FIGS. 1 to 5, this embodiment provides a liner structure 100 including a liner main body 2 and an insert 3 located inside an opening of the liner main body 2. The liner main body 2 is made of a polybutylene material. The insert 3 and the opening of the liner main body 2 are nested with each other. The insert 3 is provided with a via 31 and an extension 21 extending through the via 31 is disposed at the opening of the liner main body 2.

In this embodiment, the insert 3 has a flat circular bottom surface, and a connection 34 in the shape of cylinder is formed above the bottom. A threaded port is disposed inside the connection 34 and is disposed to connect with other parts. The vias 31 are uniformly distributed on the bottom surface along a circumferential direction and disposed to accommodate the extension 21 of the opening of the liner main body 2 which extends through the via 31. After the extension 21 extends through all vias 31, the insert 3 and the opening of the liner main body 2 forms a structure in which the insert 3 and the opening of the liner main body 2 are nested with each other, so that relative rotation does not occur easily.

The polybutylene material has good mechanical performance and heat resistance performance within the temperature range of hot water. The liner main body 2 is manufactured through using the polybutylene material so as to be used for containing hot water and meet a use demand. However, since the polybutylene material cannot adhere very firmly to the surface of the insert 3 during a molding process, the liner main body 2 made of the polybutylene material is easy to fall off. In this embodiment, the insert 3 and the opening of the liner main body 2 together form a nested structure, which has effects of positioning and stabilization, so that the liner main body 2 is not easy to fall off. Performance defects of the polybutylene material are overcome by using structural features.

Exemplarily, the diameter of the front end of the extension 21 of the opening of the liner main body 2 extending through the via 31 is larger than the diameter of the via 31. In this manner, even if the insert 3 moves in the direction of detaching from the opening of the liner main body 2, the insert 3 can be stuck by the front end of the extension 21 with a relatively large diameter and cannot detach easily.

In this case, during the molding process of the liner main body 2, the preform of the polybutylene material is heated to a molten state and then extends through each via 31 of the insert 3. Subsequently, during the mold closing process, the extension 21 extending through the via 31 is combined with materials extruded from other directions (that is, the other portion of the liner main body 2 except the extension 21). Therefore, a case in which the diameter of the end of the extension 21 extending through the via 31 (that is, the diameter of the front end described above) is larger than the diameter of the via 31 of the insert 3 is formed. Therefore, after molding, the liner main body 2 can form a firm nested structure with the insert 3.

Figure 4:
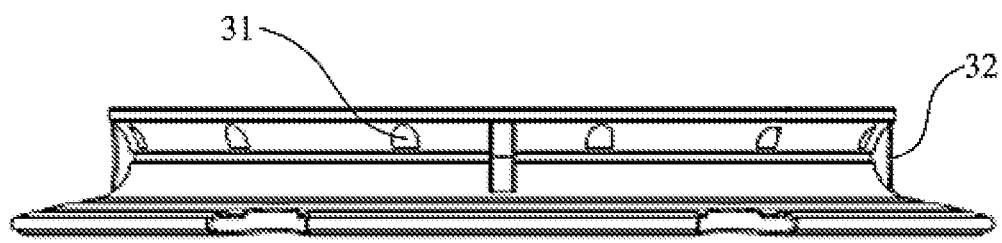
FIG. 4 is a side view of an insert according to an embodiment of the present application.
Figure 5:
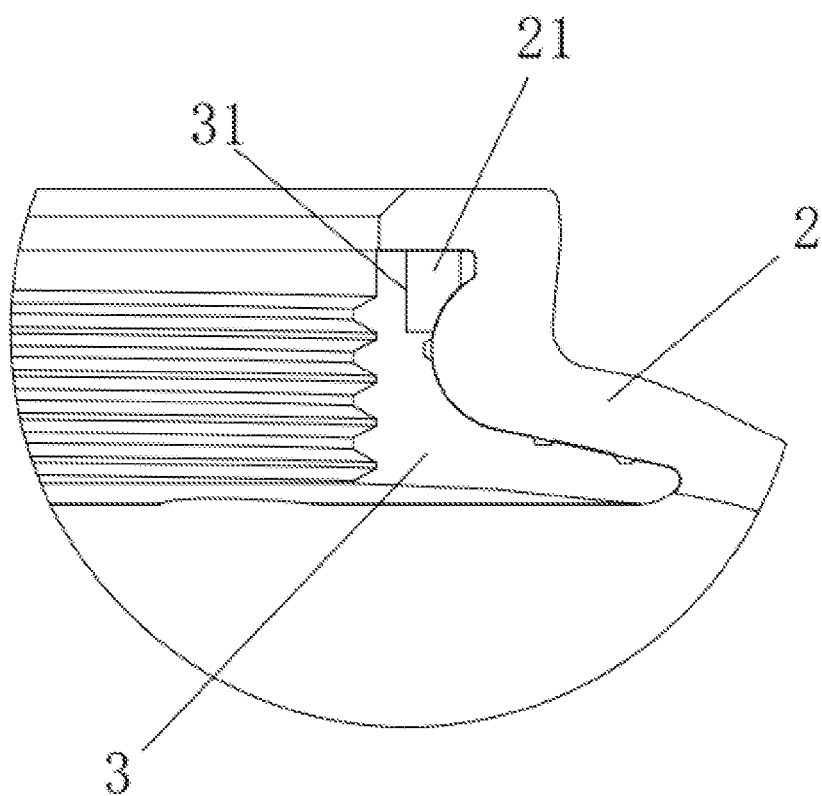
FIG. 5 is a view illustrating the structure of a portion of a liner structure according to an embodiment of the present application.

As can be seen from the above description and FIG. 4, the front ends of the two extensions 21 extending through different vias 31 are connected integrally, and the front ends of two adjacent extensions 21 are connected integrally. Thus, front ends of a plurality of extensions 21 extending through the different vias 31 are connected integrally.

In this embodiment, the front ends of a plurality of extensions 21 are connected integrally. Not only can the entire nested structure have a better fixing effect, but loads in each direction of the circumference can be evenly distributed, thereby extending the service life of the liner structure 100.

As shown in FIGS. 1 to 4, the insert 3 also has a rotation stop feature. The rotation stop feature locates on the contact surface of the insert 3 and the liner main body 2. The rotation stop feature includes a reinforcing rib 32 arranged axially along the opening of the liner main body 2. The reinforcing rib 32 cooperates with the liner main body 2. The rotation stop feature further includes a notch 33 located on the outer edge of the insert 3. The notch 33 cooperates with the liner main body 2.

In this embodiment, a radial reinforcing rib 32 is disposed at a boundary between the bottom surface of the insert 3 and the connection 34. The reinforcing rib 32 is arranged axially along the opening of the liner main body 2. The outer edge of the bottom surface of the insert 3 is processed to form the notch 33. The notch 33 cooperates with the liner main body 2.

In order to overcome performance defects of the polybutylene material, in addition to a nested feature, the rotation stop features such as the reinforcing rib 32 and the notch 33 are also used to reduce the possibility of the relative rotation of the insert 3 and the liner main body 2. A plurality of rotation stop features can be used to distribute a portion of forces between the extension 21 and the insert 3 so that the extension 21 and the insert 3 are not easy to be damaged and the service lives of the extension 21 and the insert 3 are extended.

Figure 6:
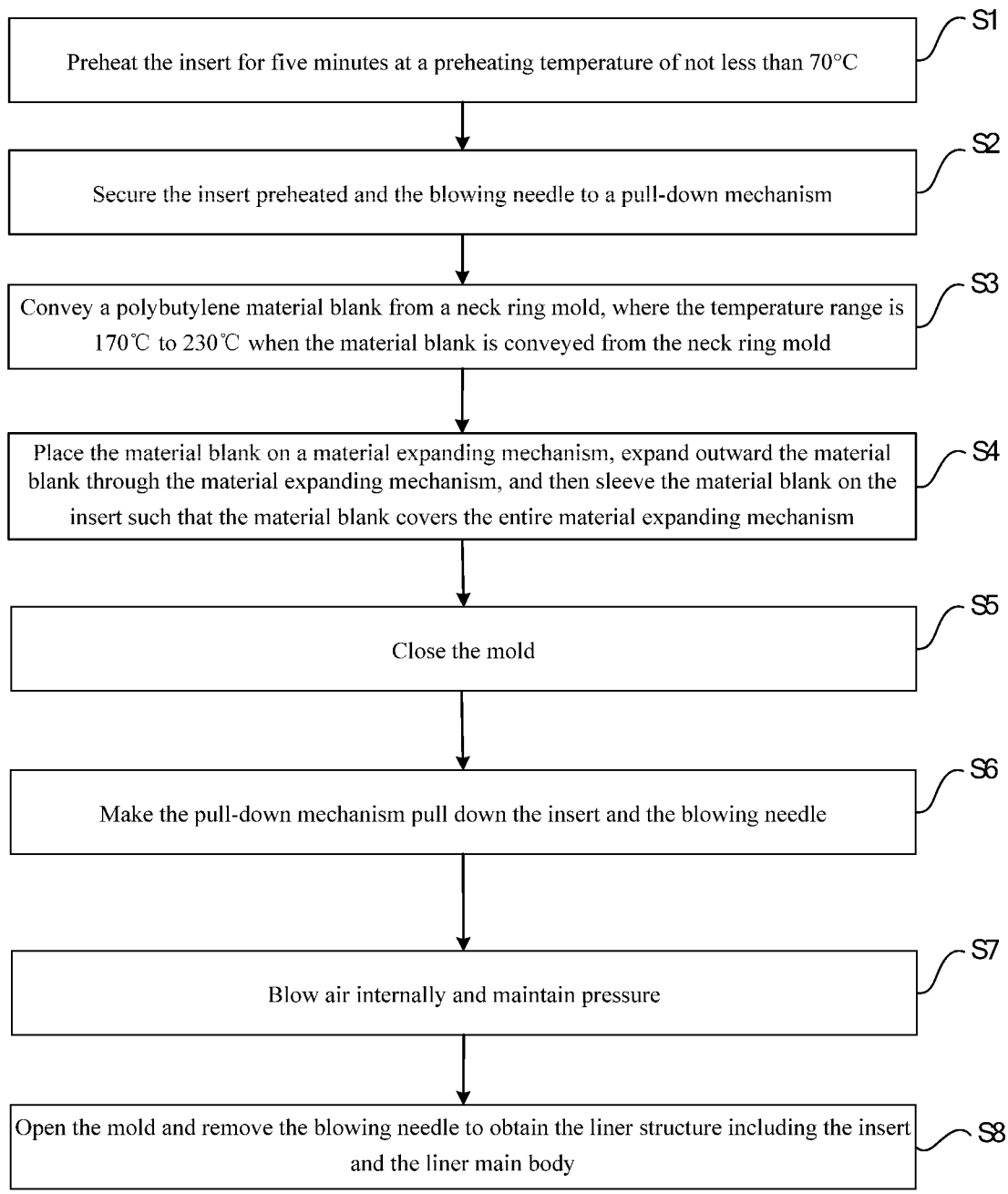
FIG. 6 is a flowchart of a blow-molding manufacturing method for a liner structure according to an embodiment of the present application.

As shown in FIG. 6, this embodiment further provides a blow-molding manufacturing method for a liner structure 100. The blow-molding manufacturing method for a liner structure 100 includes steps S1 to S8.

In step S1, the insert 3 is preheated for five minutes at a preheating temperature of not less than 70° C.

In step S2, the insert 3 preheated and a blowing needle are secured to a pull-down mechanism.

In step S3, a polybutylene material blank is conveyed from a neck ring mold, where the temperature range when the material blank is conveyed is 170° C. to 230° C.

In step S4, the material blank is placed on a material expanding mechanism, then the material blank is expanded outward through the material expanding mechanism, and then the material blank is sleeved on the insert 3. The material blank covers the entirety of the material expanding mechanism.

In step S5, the mold is closed.

In step S6, the pull-down mechanism pulls down the insert 3 and the blowing needle.

In step S7, the air is blown internally and the pressure is maintained.

In step S8, the mold is opened and the blowing needle is removed to obtain the liner structure 100 including the insert 3 and the liner main body 2.

In the above-described steps, the polybutylene material blank is heated to 170° C. to 230° C. The material blank is expanded outward and sleeved on the insert 3 by the material expanding mechanism. Then the mold is closed and the insert 3 and the blowing needle are pulled down by the pull-down mechanism blowing air internally and maintaining pressure. Finally, the liner structure 100 including the insert 3 and the liner main body 2 is obtained.

In this embodiment, the liner structure 100 made of a polybutylene material is manufactured by blow-molding. Through process optimization, the defects that the liner structure 100 made of the polybutylene material is easy to crack and cannot be combined tightly in the molding process are overcome. The method for manufacturing a liner structure 100 through blow-molding is obtained, so that the difficulty and cost of manufacturing the liner structure 100 are reduced, and the manufacturing efficiency is improved.

In the step S1 of this embodiment, before a manufacturing process starts, the insert 3 in direct contact with the material blank is preheated to a preset temperature, so that the insert 3 does not have a rapid cooling effect on the polybutylene material in direct contact with the insert 3 in the subsequent manufacturing process, thereby maintaining the fluidity of the insert 3 at a high temperature. In this manner, a liner material and the insert 3 are nested more fully and bonded more firmly, and do not delaminate, and thus the structural strength of the liner structure 100 can be improved, and yield can be improved in the manufacturing process.

In step S4 of this embodiment, the material blank with a relatively small diameter is expanded outward and then sleeved on the insert 3 so that the material blank is combined tightly with the insert 3, and thus the nested structure is easier to form. In addition, a lighter and thinner liner main body 2 can be obtained by using the material blank with a small diameter, which is advantageous for molding while reducing the cost and improving the material utilization rate.

In contrast, if the material blank with a large diameter is used, on the one hand, the overall weight of the liner structure 100 is increased, resulting in an increase in the cost, on the other hand, the material blank with the large diameter cannot be ensured to stretch uniformly in the blow-molding process. Wall thickness varies depending on the sufficient degree of stretching, affecting the overall quality of a product.

In step S4 of this embodiment, the entirety of the material expanding mechanism is covered with the material blank, so that the expanding outward is easier and an outward expanding effect is more uniform, making blow molding more advantageous.

In step S6 of this embodiment, the insert 3 preheated and the blowing needle are pulled down after the mold is closed, so that the polybutylene material can form the extension 21 through the via 31 during a pull-down process, so that the insert 3 is combined more tightly with the liner main body 2 and does not fall off easily.

After repeated testing and process optimization, in step S3 of this embodiment, the temperature range of the material blank is 190° C. to 210° C. Blow molding within the above temperature range can make the polybutylene material blank blow-molded at a suitable molding temperature to avoid molding defects such as fracture due to falling material and cracking due to insufficient strength so as to obtain the best mechanical performance and heat resistance performance, and thus the liner structure 100 can be used for containing hot water to meet demand of users for a filter material tank which directly softens hot water.

According to a liner structure and a blow-molding manufacturing method for a liner structure in the present application, the liner structure 100 has relatively good heat resistance within a temperature range corresponding to conventional liquid water, and the liner structure 100 can be used for containing hot water. Moreover, a feasible manufacturing method is provided. The method can be used for manufacturing the liner structure by overcoming defects of material characteristics through process optimization.

What is claimed is:

1. A liner structure, comprising a liner main body and an insert located inside an opening of the liner main body, wherein the liner main body has a portion which is at the opening and covers a top surface of the insert, so that the insert is not exposed on an outside of the liner main body, wherein the top surface of the insert faces an opening direction of the opening of the liner main body, wherein the liner main body is made of a polybutylene material;
   wherein the insert and the opening of the liner main body are nested with each other;
   wherein the insert is provided with a via, and an extension protruding from the portion of the liner main body is disposed at the opening of the liner main body and extends through the via;
   wherein a diameter of a front end of the extension is larger than a diameter of the via, wherein the front end of the extension faces away from the portion of the liner main body and extends beyond the via.

2. A blow-molding manufacturing method for a liner structure, wherein the liner structure comprises a liner main body and an insert located inside an opening of the liner main body, wherein the liner main body has a portion which is at the opening and covers a top surface of the insert so that the insert is not exposed on an outside of the liner main body, wherein the top surface of the insert faces an opening direction of the opening of the liner main body;
   wherein the insert and the opening of the liner main body are nested with each other;
   wherein the insert is provided with a via, and an extension protruding from the portion of the liner main body is disposed at the opening of the liner main body and extends through the via;
   wherein a diameter of a front end of the extension is larger than a diameter of the via, wherein the front end of the extension faces away from the portion of the liner main body and extends beyond the via;

the blow-molding manufacturing method for the liner structure comprising:

preheating the insert; and conveying a polybutylene material blank from a neck ring mold, wherein a temperature range of the material blank is 170° C. to 230° C. when the material blank is conveyed from the neck ring mold.

3. The method of claim 2, before conveying the material blank from the neck ring mold, the method further comprising securing the insert preheated and a blowing needle to a pull-down mechanism.

4. The method of claim 3, further comprising:

closing a mold; and making the pull-down mechanism pull down the insert and the blowing needle.

5. The method of claim 4, after conveying the polybutylene material blank from the neck ring mold and before closing the mold, the method further comprising:

placing the material blank on a material expanding mechanism, expanding the material blank outward through the material expanding mechanism, and then sleeving the material blank on the insert.

6. The method of claim 5, wherein the material blank covers an entirety of the material expanding mechanism.

7. The method of claim 3, wherein the insert has a preheating time of not less than five minutes and a preheating temperature of not less than 70° C.

8. The method of claim 3, wherein the temperature range of the material blank is 190° C. to 210° C.

* * * * *